United States Patent
Sanchez et al.

(10) Patent No.: US 11,640,479 B1
(45) Date of Patent: May 2, 2023

(54) MITIGATING WEBSITE PRIVACY ISSUES BY AUTOMATICALLY IDENTIFYING COOKIE SHARING RISKS IN A COOKIE ECOSYSTEM

(71) Applicant: NortonLifeLock Inc., Tempe, AZ (US)

(72) Inventors: Iskander Sanchez, Antibes (FR); Leylya Yumer, Antibes (FR)

(73) Assignee: NORTONLIFELOCK INC., Tempe, AZ (US)

( * ) Notice: Subject to any disclaimer, the term of this patent is extended or adjusted under 35 U.S.C. 154(b) by 52 days.

(21) Appl. No.: 17/191,454

(22) Filed: Mar. 3, 2021

(51) Int. Cl.
  *H04L 9/40* (2022.01)
  *G06F 21/62* (2013.01)
  *G06F 16/958* (2019.01)

(52) U.S. Cl.
  CPC ........ *G06F 21/6245* (2013.01); *G06F 16/958* (2019.01)

(58) Field of Classification Search
  CPC ............... G06F 21/6245; G06F 16/958; G06F 21/6263; G06F 40/14; H04L 63/1475
  USPC ............................................ 726/26; 715/234
  See application file for complete search history.

(56) References Cited

U.S. PATENT DOCUMENTS

| | | | |
|---|---|---|---|
| 6,341,310 B1* | 1/2002 | Leshem | G06Q 30/02 714/E11.181 |
| 8,930,818 B2* | 1/2015 | Cordasco | H04L 67/75 715/736 |
| 2002/0191032 A1* | 12/2002 | Brown | G06F 3/0481 715/838 |
| 2004/0049673 A1* | 3/2004 | Song | G06F 21/6209 707/E17.116 |
| 2006/0156387 A1* | 7/2006 | Eriksen | H04L 67/02 726/3 |
| 2011/0214163 A1* | 9/2011 | Smith | H04L 67/02 726/4 |
| 2021/0382949 A1* | 12/2021 | Yastrebenetsky | G06F 21/577 |

OTHER PUBLICATIONS

Alexander Fox, The Ultimate Superuser's Guide to uBlock Origin, published Feb. 25, 2019 via maketecheasier, pp. 1-22 (pdf).*
Nortonlifelock; "Norton Safe Web feature: Link Guard"; Webpage; located at: https://ie.norton.com/feature/safe-web#linkguard; accessed on Aug. 9, 2021; 2 pages.

(Continued)

*Primary Examiner* — Manglesh M Patel
(74) *Attorney, Agent, or Firm* — Maschoff Brennan

(57) ABSTRACT

Mitigating website privacy issues by automatically identifying cookie sharing risks in a cookie ecosystem. In some embodiments, a method may include generating, by the computing device, a cookie tree representing cookies created on a web browser while browsing a website. The cookie tree may include nodes representing organizations. The cookie tree may further include hierarchical edges between the nodes representing creation chains of the nodes. The method may also include determining, by the computing device, a creator, a sender, and a receiver of each of the cookies. The method may further include mitigating, by the computing device, website privacy issues based on the creator, sender, and receiver of each of the cookies.

20 Claims, 5 Drawing Sheets

(56) References Cited

OTHER PUBLICATIONS

Kameleo; "Avoid Browser Fingerprinting and Use Virtual Profiles"; Webpage; located at: https://www.producthunt.com/posts/kameleo; accessed on Aug. 9, 2021; 3 pages.
Google Safe Browsing > Safe Browsing AP's (v4); "URLs and Hashing"; Webpage; located at: https://developers.google.com/safe-browsing/v4/urls-hashing; accessed on Aug. 9, 2021; 4 pages.
Github; "Google/safebrowsing"; Webpage; located at: https://github.com/google/safebrowsing; accessed on Aug. 9, 2021; 2 pages.
Disconnect; "Take Control of Your Privacy"; Webpage; located at: https://disconnect.me/; accessed on Aug. 9, 2021; 4 pages.
Duckduckgo; "Duckduckgo Privacy Essentials"; Webpage; located at: https://chrome.google.com/webstore/detail/duckduckgo-privacy-essent/bkdgflcldnnnapblkhphbgpggdiikppg?hl=en; accessed on Aug. 9, 2021; 1 page.
Brave; "Browse 3x faster than Chrome"; Webpage; located at: https://brave.com/; accessed on Aug. 9, 2021; 5 pages.
OneTrust; "OneTrust Privacy—Privacy Management Software"; Webpage; located at: https://www.onetrust.com/solutions/privacy-management/; accessed on Aug. 9, 2021; 4 pages.
Avast Software s.r.o; "Avast Anti-Track Premium"; Webpage; located at: i. https://www.avast.com/en-nz/antitrack#pc; accessed on Aug. 16, 2021; 5 pages.
The Guardian, "A year-long investigation into facebook, data, and influencing elections in the digital age," https://www.theguardian.com/news/series/cambridge-analytica-files, 2018.
European Union, "Directive 2009/136/EC of the European Parliament and of the Council of Nov. 25, 2009," Official Journal of the European Union, 2009.
The European Parliament and of the Council of the European Union; "Regulation (EU) 2016/679 of the European Parliament and of the Council of Apr. 27, 2016," Official Journal of the European Union, 2016.
I. Lapowsky, "California unanimously passes historic privacy bill," https://www.wired.com/story/california-unanimously-passes-historic-privacy-bill/, 2018.
S. Englehardt and A. Narayanan, "Online tracking: A 1-million-site measurement and analysis," in ACM Conference on Computer and Communications Security (CCS), 2016.
G. Franken, T. Van Goethem, and W. Joosen, "Who left open the cookie jar? a comprehensive evaluation of third-party cookie policies," in USENIX Security Symposium (Sec), 2018.
P. Papadopoulos, N. Kourtellis, and E. Markatos, "Cookie synchronization: Everything you always wanted to know but were afraid to ask," in The Web Conference (WWW), 2019.
T. Urban, D. Tatang, M. Degeling, T. Holz, and N. Pohlmann, "Measuring the impact of the gdpr on data sharing in ad networks," in ACM Asia Conference on Computer and Communications Security (AsiaCCS), 2020.
J. Brookman, P. Rouge, A. Alva, and C. Yeung, "Cross-device tracking: Measurement and disclosures," Privacy Enhancing Technologies (PETs), No. 2, 2017.
N. Nikiforakis, L. Invernizzi, A. Kapravelos, S. Van Acker, W. Joosen, C. Kruegel, F. Piessens, and G. Vigna, "You are what you include: large-scale evaluation of remote javascript inclusions," in ACM Conference on Computer and Communications Security (CCS), 2012.
D. Kumar, Z. Ma, Z. Durumeric, A. Mirian, J. Mason, J. A. Halderman, and M. Bailey, "Security challenges in an increasingly tangled web," in The Web Conference (WWW), 2017.
T. Lauinger, A. Chaabane, S. Arshad, W. Robertson, C. Wilson, and E. Kirda, "Thou shalt not depend on me: Analysing the use of outdated javascript libraries on the web," in Network and Distributed System Security Symposium (NDSS), 2017.
S. Arshad, A. Kharraz, and W. Robertson, "Include me out: In-browser detection of malicious third-party content inclusions," in International Conference on Financial Cryptography and Data Security (FC), 2016.
T. Urban, M. Degeling, T. Holz, and N. Pohlmann, "Beyond the Front Page: Measuring Third Party Dynamics in the Field," in The Web Conference (WWW), 2020.
V. Le Pochat, T. Van Goethem, S. Tajalizadehkhoob, M. Korczy'nski, and W. Joosen, "Tranco: A research-oriented top sites ranking hardened against manipulation," in Network and Distributed System Security Symposium (NDSS), 2019.
Alexa, "SEO and Competitive Analysis Software." https://www.alexa.com/, 2019.
Cisco Umbrella, "Umbrella Popularity List." https://umbrella-static.s3-us-west-1.amazonaws.com/index.html, 2019.
Majestic, "The Majestic Million." https://majestic.com/reports/majestic-million, 2019.
Quantcast, "Audience Insights That Help You Tell Better Stories." https://www.quantcast.com/top-sites/, 2019.
I. Sanchez-Rola, D. Balzarotti, C. Kruegel, G. Vigna, and I. Santos, "Dirty Clicks: a Study of the Usability and Security Implications of Click-related Behaviors on the Web," in The Web Conference (WWW), 2020.
E. Sangaline, "Making Chrome Headless Undetectable," https://intoli.com/blog/making-chrome-headless-undetectable/, 2017.
E. Sangaline, "It is Not Possible to Detect and Block Chrome Headless," https://intoli.com/blog/not-possible-to-block-chrome-headless/, 2018.
Dymo, "Missing Accept languages in Request for Headless Mode," https://bugs.chromium.org/p/chromium/issues/detail?id=775911, 2017.
ChromeDevTools, "DevTools Protocol API," https://github.com/ChromeDevTools/debugger-protocol-viewer, 2019.
O. Starov and N. Nikiforakis, "Extended tracking powers: Measuring the privacy diffusion enabled by browser extensions," in The Web Conference (WWW), 2017.
I. Sanchez-Rola, M. Dell'Amico, P. Kotzias, D. Balzarotti, L. Bilge, P.-A. Vervier, and I. Santos, "Can I opt out yet?: GDPR and the global illusion of cookie control," in ACM Asia Conference on Computer and Communications Security (AsiaCCS), 2019.
R. Cointepas, "CNAME cloaking, the dangerous disguise of third-party trackers," https://medium.com/nextdns/cname-cloakingthe-dangerous-disguise-of-third-party-trackers-195205dc522a, 2019.
NextDNS, "NextDNS CNAME cloaking blocklist," https://github.com/nextdns/cname-cloakin-blocklist, 2019.
J. Kurkowski, "tldExtract: Accurately separate the TLD from the registered domain and subdomains of a URL, using the Public Suffix List," https://github.com/john-kurkowski/tldextract, 2019.
Disconnect, "Make the web faster, more private, and more secure," https://github.com/disconnectme, 2019.
Cliqz GmbH, "WhoTracks.me: Bringing Transparency to Online Tracking," https://github.com/cliqz-oss/whotracks.me, 2019.
T. Libert, "Webxray, a tool for analyzing third-party content on webpages and identifying the companies which collect user data." https://github.com/timlib/webXray, 2019.
P. Kotzias, L. Bilge, P.-A. Vervier, and J. Caballero, "Mind your own business: A longitudinal study of threats and vulnerabilities in enterprises." in Network and Distributed System Security Symposium (NDSS), 2019.
Merit Network Inc., "IRR—Internet Routing Registry," http://www.irr.net/.
"WhoisXML API," https://www.whoisxmlapi.com/.
N. Raghavan, R. Albert, and S. Kumara, "Near Linear Time Algorithm to Detect Community Structures in Large-Scale Networks," Physical review. E, Statistical, nonlinear, and soft matter physics, 10 2007.
ShareThis, "Social Share Buttons and Plugins for Websites." https://sharethis.com/, 2019.
Google Marketing Platform, "A unified advertising and analytics platform." https://marketingplatform.google.com, 2019.
Matomo, "Secure Open Web Analytics Platform." https://matomo.org/, 2019.
JQuery, "Fast, small, and feature-rich JavaScript library." https://jquery.com/, 2019.
Bootstrap, "Open source toolkit for developing with HTML, CSS, and JS." https://getbootstrap.com/, 2019.
Modernizr, "Feature detection library for HTML5/CSS3." https://modernizr.com/, 2019.

(56) References Cited

OTHER PUBLICATIONS

Threat Intelligence, FireEye, "Pinpointing Targets: Exploiting Web Analytics to Ensnare Victims," https://www2.fireeye.com/rs/848-DID-242/images/rpt-witchcoven.pdf, 2015.
Security Response, Symantec, "The Waterbug attack group," http://www.symantec.com/content/en/us/enterprise/media/security response/whitepapers/waterbug-attack-group.pdf, 2015.
Symantec, "The Need for Threat Risk Levels in Secure Web Gateways," https://www.symantec.com/content/dam/symantec/docs/white-papers/need-for-threat-tisk-Levels-in-secure-web-gateways-en.pdf, 2017.
Symantec, "WebPulse," https://www.symantec.com/content/dam/symantec/docs/white-papers/webpulse-en.pdf, 2017.
G. Wondracek, T. Holz, C. Platzer, E. Kirda, and C. Kruegel, "Is the internet for porn? an insight into the online adult industry." in Workshop on the Economics of Information Security (WEIS), 2010.
Towerdata, "Privacy policy," https://www.towerdata.com/privacy-policy, 2019.
A. Clauset, C. R. Shalizi, and M. E. Newman, "Powerlaw distributions in empirical data," SIAM review, vol. 51, No. 4, pp. 661-703, 2009.
T. Squartini, F. Picciolo, F. Ruzzenenti, and D. Garlaschelli, "Reciprocity of weighted networks," Scientific Reports, vol. 3, No. 1, pp. 1-9, Sep. 2013.
Mozilla Foundation, "Security/Tracking protection," https://wiki.mozilla.org/Security/Tracking protection, 2019.
AdGuard, "Adguard content blocking filters," https://github.com/AdguardTeam, 2019.
EasyList, "Easylist filter subscription," https://github.com/easylist, 2019.
U. Iqbal, Z. Shafiq, and Z. Qian, "The ad wars: retrospective measurement and analysis of anti-adblock filter lists," in Internet Measurement Conference (IMC), 2017.
S. Zhu, X. Hu, Z. Qian, Z. Shafiq, and H. Yin, "Measuring and disrupting anti-adblockers using differential execution analysis," in Network and Distributed System Security Symposium (NDSS), 2018.
B. Krishnamurthy and C. Wills, "Privacy diffusion on the web: a longitudinal perspective," in The Web Conference (WWW), 2009.
F. Roesner, T. Kohno, and D. Wetherall, "Detecting and defending against third-party tracking on the web," in Networked Systems Design and Implementation (NSDI), 2012.
I. Sanchez-Rola and I. Santos, "Knockin' on trackers' door: Large-scale automatic analysis of web tracking," in Conference on Detection of Intrusions and Malware, and Vulnerability Assessment (DIMVA), 2018.
S. Sivakorn, I. Polakis, and A. D. Keromytis, "The cracked cookie jar: Http cookie hijacking and the exposure of private information," in IEEE Symposium on Security and Privacy (SP), 2016.
I. Sanchez-Rola, D. Balzarotti, and I. Santos, "Baking-Timer: Privacy Analysis of Server-Side Request Processing Time," in Annual Computer Security Applications Conference (ACSAC), 2019.
G. Acar, C. Eubank, S. Englehardt, M. Juarez, A. Narayanan, and C. Diaz, "The web never forgets: Persistent tracking mechanisms in the wild," in ACM Conference on Computer and Communications Security (CCS). ACM, 2014.
A. Ghosh, M. Mahdian, R. P. McAfee, and S. Vassilvitskii, "To match or not to match: Economics of cookie matching in online advertising," ACM Transactions on Economics and Computation (TEAC), vol. 3, No. 2, pp. 1-18, 2015.

\* cited by examiner

US 11,640,479 B1

MITIGATING WEBSITE PRIVACY ISSUES BY AUTOMATICALLY IDENTIFYING COOKIE SHARING RISKS IN A COOKIE ECOSYSTEM

BACKGROUND

Online user privacy is an important need both for individuals and for institutions. Furthermore, with the adoption of the General Data Protection Regulation (GDPR) in the European Union (EU), and other similar laws and regulations in other countries, there is an increasing need for websites to become compliant with privacy regulations, and to protect users from being tracked without users' knowledge or permission. Some current methods and systems to protect user privacy on the Internet are limited to blacklists. However, a blacklist may only be useful for identifying malware using an already existing database of file hash functions (e.g., MD5s). Thus, a solution to determine and protect user privacy on the Internet and to help websites become compliant with privacy laws and regulations is needed.

The subject matter claimed herein is not limited to embodiments that solve any disadvantages or that operate only in environments such as those described above; rather, this background is only provided to illustrate one example technology area where some embodiments described herein may be practiced.

SUMMARY

In some embodiments, a computer-implemented method for mitigating website privacy issues by automatically identifying cookie sharing risks in a cookie ecosystem may be performed by a computing device including one or more processors. The method may include generating, by the computing device, a cookie tree representing cookies created on a web browser while browsing a website. The cookie tree may include nodes representing organizations. The cookie tree may further include hierarchical edges between the nodes representing creation chains of the nodes. The method may also include determining, by the computing device, a creator, a sender, and a receiver of each of the cookies. The method may further include mitigating, by the computing device, website privacy issues based on the creator, sender, and receiver of each of the cookies.

In some embodiments, the mitigating of the website privacy issues may include blocking one or more of the cookies, disabling one or more of the cookies, preventing creation of one or more cookies that are similar to one or more of the cookies, alerting an administrator regarding one or more of the cookies, or some combination thereof.

In some embodiments, the determining of the creator of each of the cookies may include determining that the creator is a first party creator in which the website sets the cookie for the website, a third party creator in which a third-party resource that is loaded externally from the website sets the cookie for a third party, or a ghostwriter creator in which in which a third-party resource that is loaded externally from the website sets the cookie for the website.

In some embodiments, the determining of the sender of each of the cookies may include determining that the sender is an own sender in which the cookie is sent by a node that created the cookie, an in-chain sender in which the cookie is sent by a node that is in a creation chain of the node that created the cookie, or an off-chain sender in which the cookie is sent by a node that is not in a creation chain of the node that created the cookie.

In some embodiments, the determining of the receiver of each of the cookies may include determining that the receiver is an own receiver in which the cookie is received by a node that created the cookie, an in-chain receiver in which the cookie is received by a node that is in a creation chain of the node that created the cookie, or an off-chain receiver in which the cookie is received by a node that is not in a creation chain of the node that created the cookie.

In some embodiments, the method may further include displaying, on a computing device display, the creator, sender, and receiver of each of the cookies.

In some embodiments, the generating of the cookie tree may further include mapping multiple domains to a single organization.

In some embodiments, one or more non-transitory computer-readable media may include one or more computer-readable instructions that, when executed by one or more computing devices, cause the one or more computing devices to perform a method for mitigating website privacy issues by automatically identifying cookie sharing risks in a cookie ecosystem.

In some embodiments, a computing device may include one or more processors and one or more non-transitory computer-readable media comprising one or more computer-readable instructions that, when executed by the one or more processors, cause the computing device to perform a method for mitigating website privacy issues by automatically identifying cookie sharing risks in a cookie ecosystem.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
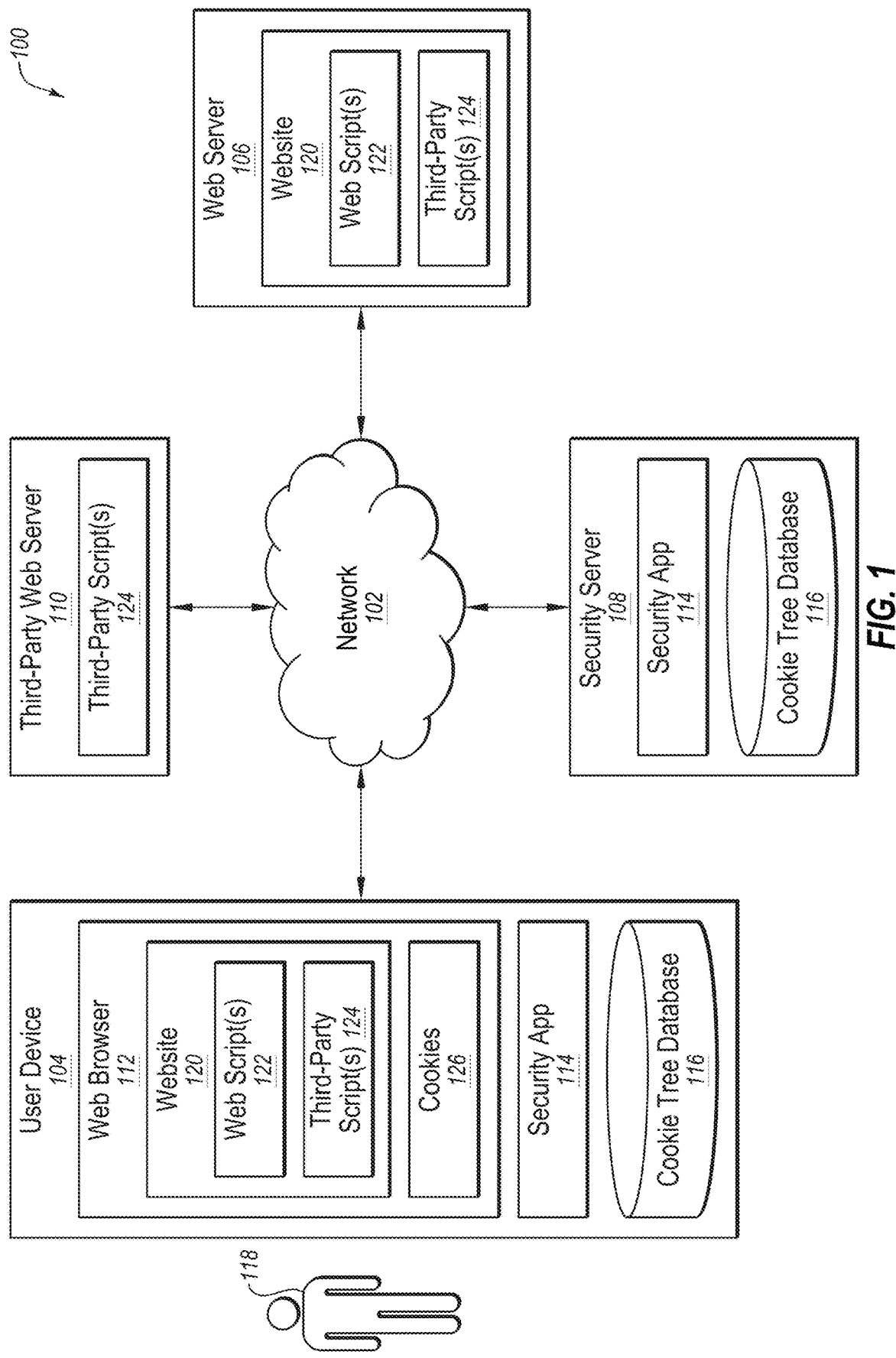
FIG. 1 illustrates an example system configured for mitigating website privacy issues by automatically identifying cookie sharing risks in a cookie ecosystem.

Tracking users' personal information and habits on the Internet is becoming more and more common, and is frequently accomplished through the use of cookies, which may be strings of text loaded onto a user's web browser when a user visits a website. A cookie may provide the website information to recognize and remember users, and may include the ability to track a variety of data, such as each user's search engine queries, the websites a user visits, the frequency of a user's return visits to a website, the speed a user scrolls through a webpage, where the user stops scrolling within a webpage, movement of a mouse cursor within a webpage, user comments, user clicks, user entries in forms, how long a user stays a specific location or at a specific website or webpage, etc. However, it may not be clear to users when they are being tracked, how they are being tracked, by whom they are being track, where the data is being sent, and why the data is being collected and sent. Furthermore, websites themselves may not be aware of all tracking of users.

In a lifetime of a website, a long list of cookies may be created for one reason or another, some unintentionally, and this may create problems for website owners that wish to provide privacy preserving services to their users. In some cases, the unintentional creation of a cookie may be due to a library that a website is loading that was not created by the website developer. For example, once a script is included in the website, the script may generate chains of calls and requests that create multiple unexpected cookies. In some cases, a website owner may not be able to identify when a cookie is created, who created the cookie, how the cookie was created, and for what reasons the cookie was created, making it difficult, if not impossible, for the website owner to filter out unnecessary, privacy-evading cookies.

Conventional solutions for identifying cookies do not take into consideration the diverse factors that are involved in the generation of cookies, and are instead concerned with looking at one side of the problem (e.g., blacklists). In addition, conventional solutions, such as ghostery and uBlock, only use blacklists to perform the analysis on whether a cookie is troublesome. A blacklist, however, may be easily bypassed by renaming the domain name of the website on which the cookie is created. Further, domain blacklisting systems may have high false positive rates, thus blocking benign scripts and cookies from some domains.

Further, while some cookies created by a visited website could be needed, cookies created by third-parties or shared among third-parties to enrich the knowledge about the user may violate the user's privacy. Websites, and the different third party scripts included in websites, may create cookies and share them with little possible user control. From the browser point of view (e.g., Google Chrome), there may be only two basic options to protect against this problem: (i) allow sites to save and read cookie data, or (ii) block third-party cookies. Therefore, there is an urgent need for a method that offers an advanced methodology for identifying all actors involved in a cookie ecosystem that create privacy risks that result from uninformed cookie creation and sharing events.

Some embodiments include mitigating website privacy issues by automatically identifying cookie sharing risks in a cookie ecosystem. In some embodiments, a security app may generate a cookie tree representing cookies created on a web browser while browsing a website. The cookie tree may include nodes representing organizations. The cookie tree may further include hierarchical edges between the nodes representing creation chains of the nodes. The security app may also determine a creator, a sender, and a receiver of each of the cookies. The security app may further mitigate website privacy issues based on the creator, sender, and receiver of each of the cookies.

Thus, some embodiments may be employed to better identify all actors involved in a cookie ecosystem that create privacy risks that result from uninformed cookie creation and sharing events. Some embodiments may identify a complete list of third-parties, with assigned roles, thus allowing the user to choose what cookies to block and what cookies to allow. These roles may constitute different privacy risks to the user depending on the website. Some embodiments may further employ this precise identification of actors in order to make the corresponding website compliant with specific privacy laws and regulations, such as the GDPR in the EU, and/or in order to protect users from being tracked without users' knowledge or permission.

Further, some embodiments look under the hood of a web page and capture the entire life of a cookie, from its creation to all the operations into which it is later involved, and uncover the intricate network of relationships between the myriad of actors that take part in the cookie ecosystem. For this purpose, some embodiments employ the concepts of cookie trees and creation and sharing chains, which enable methods to capture the dependencies and relations between entities that act as both end-points and middlemen in the cookie ecosystem. Some embodiments also employ the concept of cookie ghostwriting, which relates to cookies that are set for a party (e.g., the website the user is visiting at the moment), but are actually created by a different entity (e.g., a script loaded from an advertiser). Some embodiments pinpoint exactly which piece of code is responsible for the creation and manipulation of each cookie, and how that code ended up included in a web page in the first place, thus making it possible to draw a much clearer and more detailed picture of the cookie ecosystem and of the sharing behavior performed by tracking companies.

Turning to the figures, FIG. 1 illustrates an example system configured for mitigating website privacy issues by automatically identifying cookie sharing risks in a cookie ecosystem. The system 100 may include a network 102, a user device 104, a web server 106, a security server 108, and a third-party web server 110. In some embodiments, the user device 104 and the security server 108 may each include a security app 114. In some embodiments, the security app 114 may execute on a standalone device that communicates with the user device 104 and/or the security server 108. In other embodiments, however, the security app 114 may execute on, or be part of, the user device 104 and/or the security server 108.

In some embodiments, the network 102 may be configured to communicatively couple the user device 104, the web server 106, the security server 108, and the third-party web server 110, as well as other systems and devices. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, a cellular network, or some combination thereof.

Figure 4:
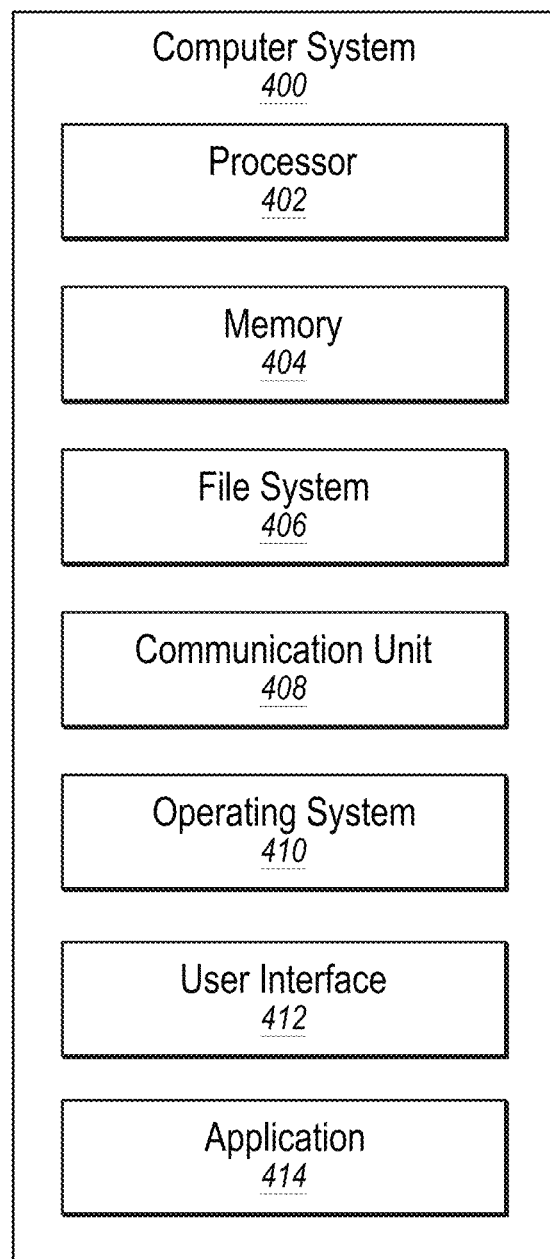
FIG. 4 illustrates an example computer system that may be employed in mitigating website privacy issues by automatically identifying cookie sharing risks in a cookie ecosystem.

In some embodiments, the user device 104 may be any computer system capable of communicating over the network 102 and executing a web browser 112 and the security app 114 and hosting a cookie tree database 116, examples of which are disclosed herein in connection with the computer system 400 of FIG. 4. Similarly, in some embodiments, the security server 108 may be any computer system capable of communicating over the network 102 and executing the security app 114 and hosting the cookie tree database 116, examples of which are disclosed herein in connection with the computer system 400 of FIG. 4. Also, in some embodiments, the web server 106 may be any computer system capable of communicating over the network 102 and hosting a website 120 with web script(s) 122 and third-party script(s) 124, examples of which are disclosed herein in connection with the computer system 400 of FIG. 4. Further, in some embodiments, the third-party web server 110 may be any computer system capable of communicating over the network 102 and hosting the third-party script(s) 124, examples of which are disclosed herein in connection with the computer system 400 of FIG. 4.

In some embodiments, the security app may be configured to generate cookie trees representing cookies 126 created on the web browser 112 while browsing the website 120. The cookies 126 may be created, for example, by the web script(s) 122 and third-party script(s) 124 that execute in connection with the website 120. These cookie trees may then be stored in the cookie tree database 116. The security app 114 may also be configured to determine a creator, a sender, and a receiver of each of the cookies 126. The security app 144 may further be configured to mitigate website privacy issues based on the creator, sender, and receiver of each of the cookies 126.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Also, the security app 114 may execute on the user device 104, on the security server 108, or on another device not illustrated in FIG. 1.

Figure 2A:
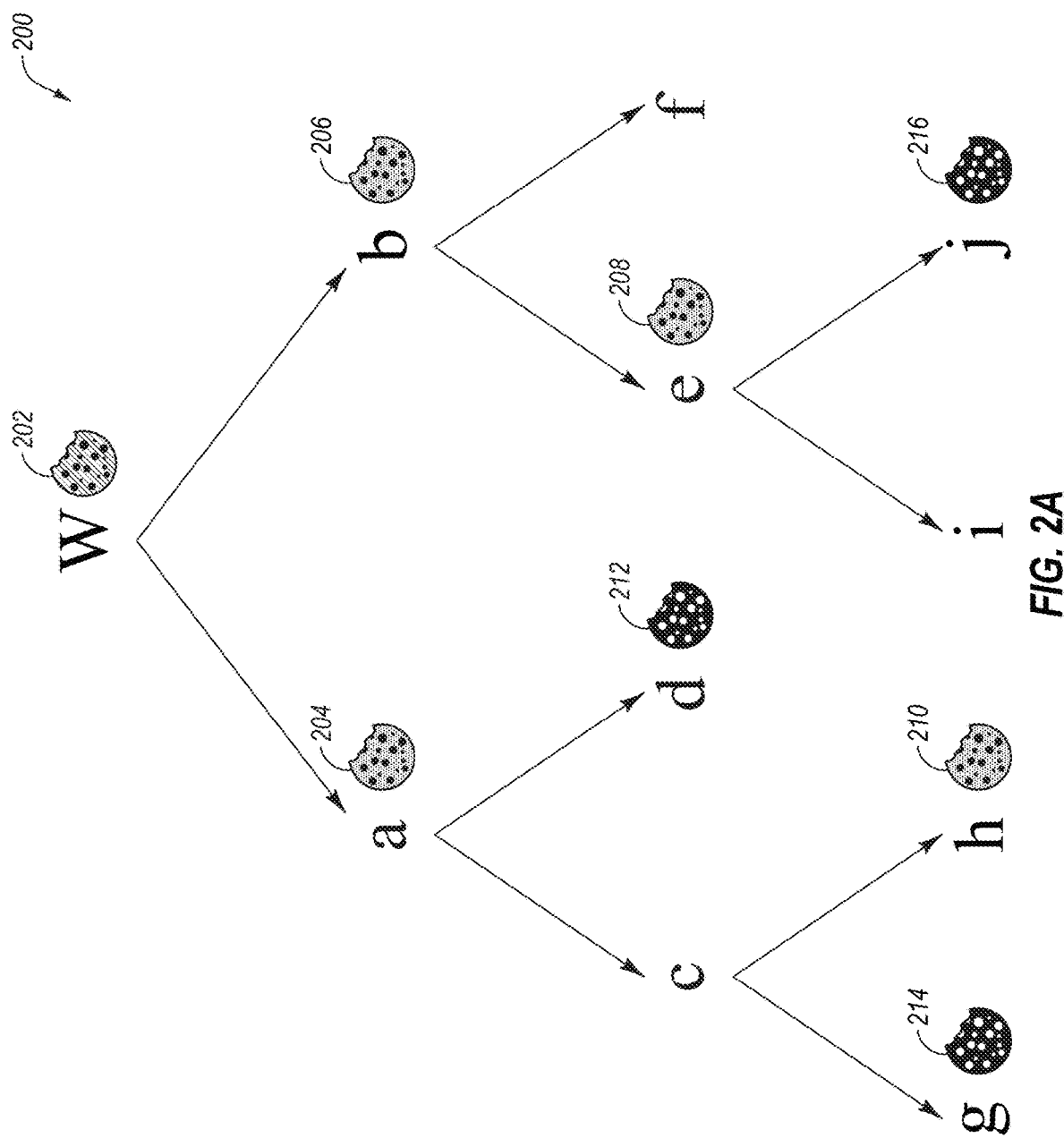
FIG. 2A illustrates an example cookie tree with example cookies and cookie creators.
Figure 2B:
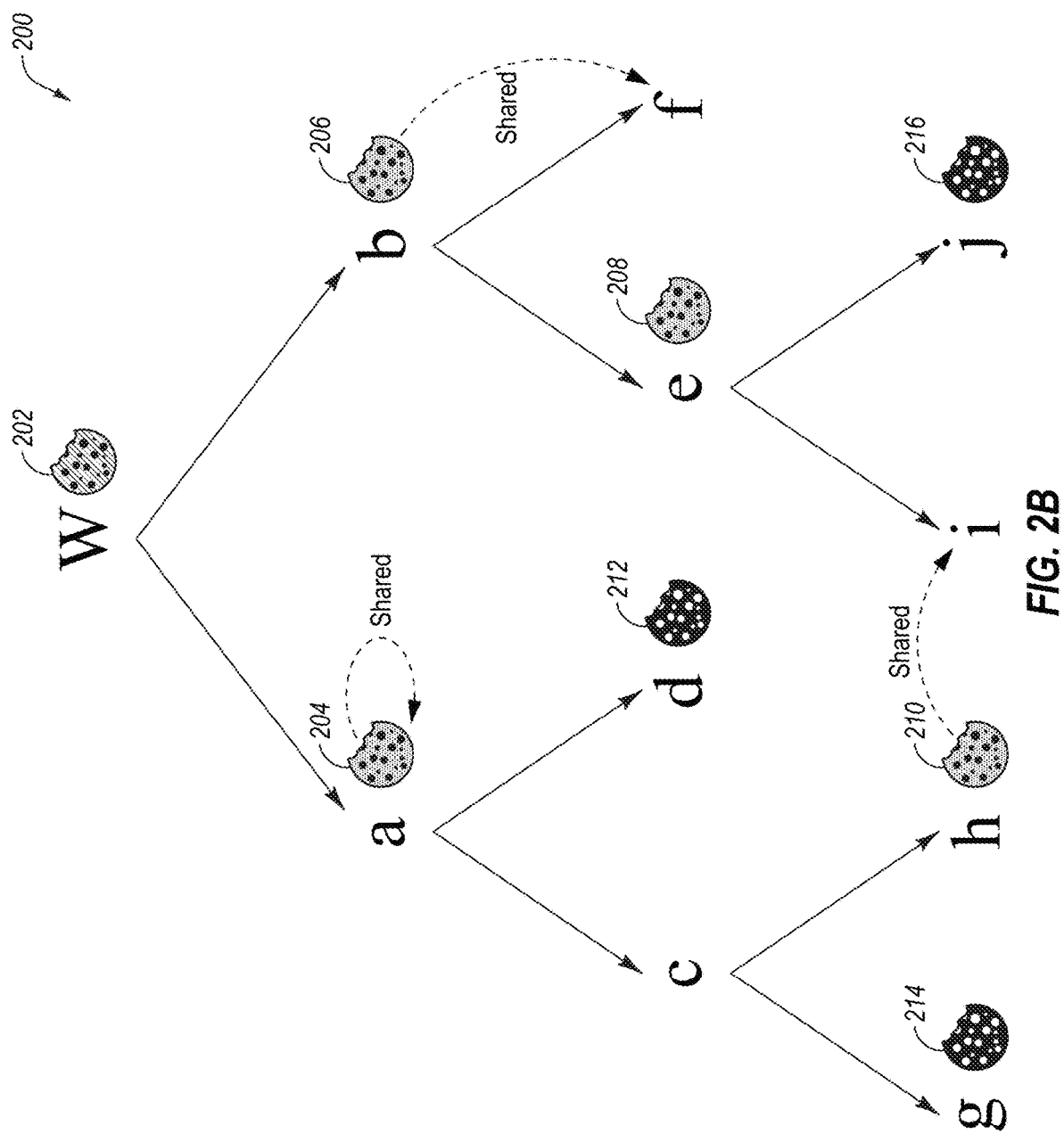
FIG. 2B illustrates the example cookie tree of FIG. 2A with example cookie senders and cookie receivers.

FIG. 2A illustrates an example cookie tree 200 with example cookies and cookie creators. FIG. 2B illustrates the example cookie tree 200 with example cookie senders and cookie receivers. As disclosed in FIGS. 2A and 2B, the cookie tree 200 includes nodes a-j each representing an organization. The cookie tree 200 also includes hierarchical edges between the nodes a-j representing creation chains of the nodes a-j.

For example, the cookie tree 200 includes a main website W (e.g., the website 120 of FIG. 1) that creates its own cookies 202, three other nodes (d, g, and j) that set third-party cookies 212, 214, and 216, and four other nodes (a, b, e, and h) that are responsible for the creation of first-party cookies 204, 206, 208, and 210. For example, the node h may provide some JavaScript code that also creates a cookie 210 as part of the website W. As an analogy, this is similar to a ghostwriter who writes content that is then published under the name of a different author. For this reason, to separate these cookies from those created by the website W itself, the cookies 204, 206, 208, and 210 may be referred to as ghosted first-party cookies.

Although previous methods may have considered all first-party cookies to be identical, the methods disclosed herein may enable a more fine-grained view that first-party cookies may be created by a variety of different actors, and often the main website W is not even aware of their existence. For example, if the website W wants to be compliant with GDPR regulations, the website W may need to have full control over all its first-party cookies—which is very difficult when those cookies are created by other components that appear deep in the cookie tree 200.

The cookie tree 200 may also enable the methods disclosed herein to emphasize the role of middlemen (such as the node c) which are not directly involved in cookie-related activities, but which may be responsible for initiating subsequent requests (such as to node g, which in turn sets the third-party cookie 214. Nodes in the cookie tree 200 that are internal nodes (i.e., nodes that are neither the root nor leaves) may be referred to as intermediaries.

A creation chain of a cookie in the cookie tree 200 may be a sequence of nodes connecting the root to the node that performs the cookie creation. Similarly, a sharing chain of a cookie in the cookie tree 200 may be a sequence of nodes leading to nodes that receive the shared cookie. Moreover, cookie flow may happen whenever a cookie is explicitly sent to an organization. To better understand and characterize the players involved in a cookie flow in the cookie tree 200, each play may be categorized in one of four main roles: (1) cookie creators, (2) intermediaries, (3) senders, and (4) receivers.

Cookie creators may be the entities that set cookies, either through a script (e.g., JavaScript) or through an HTTP header. Depending on the type of the cookie, cookie creators may be further differentiated as: (1) creators in the main website page W, (2) third parties (such as nodes d, g and j), and (3) ghost cookie creators (such as nodes a, b, e, and h). In some embodiments, primary and ghost cookies may both be treated equally as first-party cookies by web browsers.

Intermediaries may be internal nodes in the cookie tree 200 that may not directly create or handle cookies, but include resources which do. For example, the nodes a and c are intermediaries for the cookie 210 set by the node h.

Senders may retrieve cookies set by other entities and explicitly send them over an HTTP request. The role of senders can be further broken down into three categories: (1) own senders that send their own cookies (e.g., those created by the same node, such as the nodes a and b), (2) in-chain senders that send cookies created by one of their child nodes (e.g., for which the sender is part of the creation chain), and (3) off-chain senders that send cookies without being part of their creation chain (e.g., the node e, sending the cookie 210 from the node h to the node i).

Receivers may be entities that explicitly receive cookies as part of an HTTP request. The role of receivers can be further broken down into three categories: (1) own receivers that obtain cookies created by themselves (e.g., the node a), (2) in-chain receivers that obtain cookies created by their child nodes (e.g., for which the receiver is part of the creation chain), and (3) off-chain receivers that obtain cookies for which they were not part of the creation chain (e.g., the node f and the node i).

A cookie flow may include three roles: (1) the creator of the cookie, (2) the sender who reads the cookie and includes it in an HTTP request, and (3) the cookie receiver. In a common case in which the receiver is the same as the sender, this may be referred to as a self receiver.

In some embodiments, there may be multiple combinations of the aforementioned roles. Each of these roles may implicate a different risk for the information of the user.

For example, in a case of Hidden Tracking: Own Sender to Own Receiver, a popular jewelry website may offer potential buyers a customer chat. To do so, the website loads an external script provided by an online support management company. This script creates a ghosted first-party identifier in the context of the website, and sends it to its own server to match the local id with the general user cookie.

In another example, in a case of Data Sharing: Own Sender to Off-chain Receiver, an online gaming store website may include a platform that enables advertisers to publish videos. The script of this company website creates a ghosted first-party identifier in the main page. Then, this same script sends the created identifier to another company that offers web user tracking services, with which they probably have a data sharing agreement.

In another example, in a case of Identifier Stealing: Off-chain Self-Receiver, a highly accessed porn video chat website may include a third-party widget to indicate how many users are connected at that moment. This widget adds two additional scripts to the equation; the first is from a bot detection company, and the second is from a marketing company. The marketing company creates an identifier cookie, the bot detection script sends it back to himself along with other identifier cookies it did not create, maybe in an attempt to detect suspicious patterns in the cookies. It does so, however, without any direct interaction with the marketing domain.

In another example, in a case of Reciprocate Matching: In-chain Self-Receiver, a news website may include content from an advertisement company (x.com) that includes some recommended/sponsored "articles" at the bottom of the page. This company inserts content from a marketing company in the page (match.y.com), which creates an identifier cookie. After the cookie is created, this last company includes a script from the original x.com company, which sends the cookie to itself, through the match.x.com domain.

In one example, the flickr.com homepage may include an s.js JavaScript file from siftscience.com (a domain belonging to a company that provides digital trust services). The script uses a popular fingerprinting library (fingerprintjs2) to create a first-party cookie named _ssid. According to the definitions disclosed herein, this is a ghosted cookie, as it is associated to the flickr.com domain but it is in fact created by a different entity. Moreover, the same script from siftscience.com then takes the newly created cookie and sends it to hexagon-analytics.com (which provides analytics services for news and trending topics). In the model disclosed herein, this creates a cookie flow in which siftscience.com is both the ghost creator and the own sender, while hexagon-analytics.com is an off-chain receiver. The same cookie flow involving the exact same actors appears in several other popular websites, such as patreon.com and shutterstock.com.

Although not represented in FIGS. 2A and 2B, the methods disclosed herein may further cover ghosted third-party cookies that are created and shared by scripts included in other contexts (e.g., through an iframe).

The roles described herein are intentionally fine-grained in order to capture many different forms of activity an actor might be involved in in a cookie ecosystem. However, the fact that many organizations own several domains opens the door to misleading attributions. For example, Google's Gmail may retrieve cookies created by Google Analytics, but this may not be very interesting from a privacy perspective as both services belong to the same actor. Therefore, to avoid polluting results with these less relevant cases, the methods disclosed herein may aggregate nodes that belong to the same organization. For instance, if a Google-related domain loads resources from a different Google-related domain, the methods disclosed herein may merge the two nodes in a single Google node.

In some embodiments, methods disclosed herein may collect cookie information by using the Chrome debugging protocol (CDP). By tapping into its network tracing capabilities, methods may gather all requests and responses performed by the browser, including their headers and bodies. From the Set-Cookie header, methods can identify the HTTP requests that create cookies. To identify cookies created by scripts (such as JavaScript), methods may modify the cookie object implementation of the browser to capture the write operations and trace them back to the exact scripts performing the actions. As a result, for each website, methods may output the complete cookie tree by combining the stack traces of all the specific resources and requests in the entire execution context, including asynchronous JavaScript callbacks, domain/frame redirections, and dynamically embedded scripts (e.g., document.write). Methods may identify sender nodes by checking the creators of POST and GET requests with cookie content. Moreover, methods may also track cookie collisions which may be defined as an event in which a new actor overwrites a previously existing cookie on the page that was created by a different actor.

In some embodiments, methods disclosed herein may accurately detect cookie sharing events by analyzing all the requests performed during the access, and attempting to decode (e.g., BASE64) and deflate (e.g., gzip) the content in multiple layers. Some embodiments may focus only on, and construct the cookie tree 200 only for, identifier cookies where the goal is to study the privacy implications of cookies existing on web pages. Some methods may pre-filter all cookies that are unlikely to be identifiable by using the zxcvbn technique.

Figure 3:
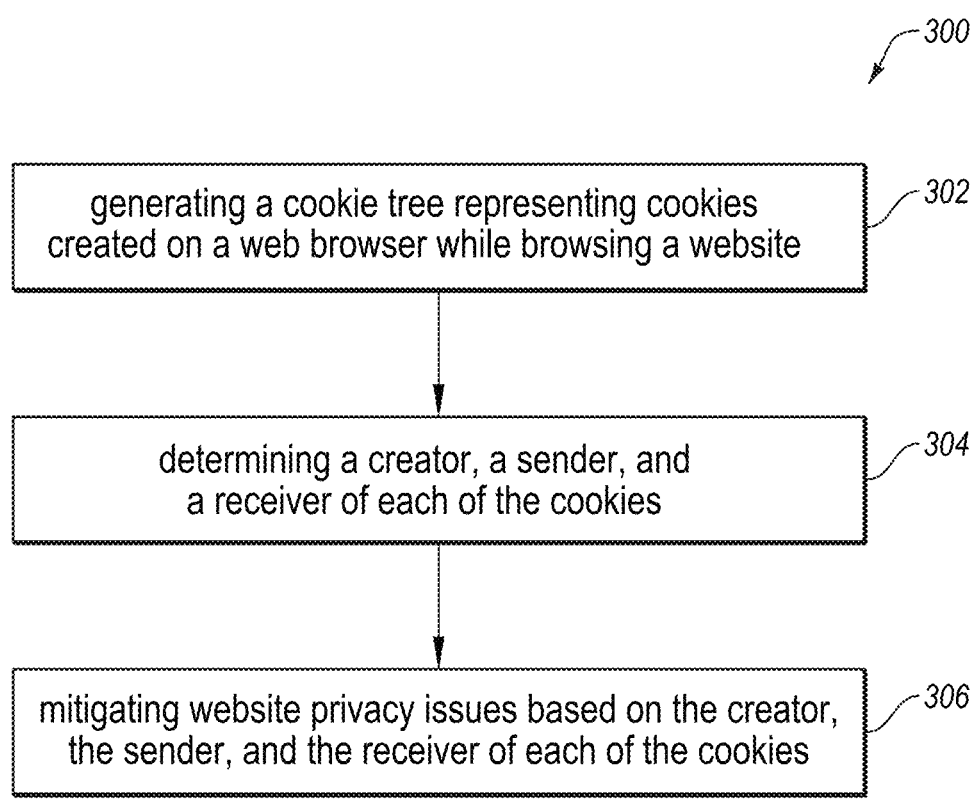
FIG. 3 illustrates a flowchart of an example method for mitigating website privacy issues by automatically identifying cookie sharing risks in a cookie ecosystem.

FIG. 3 is flowchart of an example method 300 for mitigating website privacy issues by automatically identifying cookie sharing risks in a cookie ecosystem. The method 300 may be performed, in some embodiments, by a device, application, and/or system, such as by the security app 114 of FIG. 1. In these and other embodiments, the method 300 may be performed by one or more processors based on one or more computer-readable instructions stored on one or more non-transitory computer-readable media. The method 300 will now be described in connection with FIGS. 1-3.

The method 300 may include, at action 302, generating a cookie tree representing cookies created on a web browser while browsing a website. In some embodiments, the cookie tree may include nodes representing organizations. In some embodiments, the cookie tree may further include hierarchical edges between the nodes representing creation chains of the nodes. In some embodiments, the generating of the cookie tree may further include mapping multiple domains to a single organization. For example, the security app 114 may generate the cookie tree 200 representing the cookies 126 (e.g., the cookies 202-216) created on the web browser 112 while browsing the website 120, with the root node W and other nodes a-j.

The method 300 may include, at action 304, determining a creator, a sender, and a receiver of each of the cookies. In some embodiments, the determining of the creator of each of the cookies may include determining that the creator is a first party creator in which the website sets the cookie for the website, a third party creator in which a third-party resource that is loaded externally from the website sets the cookie for a third party, or a ghostwriter creator in which in which a third-party resource that is loaded externally from the website sets the cookie for the website. In some embodiments, the determining of the sender of each of the cookies may include determining that the sender is an own sender in which the cookie is sent by a node that created the cookie, an in-chain sender in which the cookie is sent by a node that is in a creation chain of the node that created the cookie, or an off-chain sender in which the cookie is sent by a node that is not in a creation chain of the node that created the cookie. In some embodiments, the determining of the receiver of each of the cookies may include determining that the receiver is an own receiver in which the cookie is received by a node that created the cookie, an in-chain receiver in which the cookie is received by a node that is in a creation chain of the node that created the cookie, or an off-chain receiver in which the cookie is received by a node that is not in a creation chain of the node that created the cookie. For example, the security app 114 may determine a creator, a sender, and a receiver of each of the cookies 202-216 in the cookie tree 200.

The method 300 may include, at action 306, mitigating website privacy issues based on the creator, sender, and receiver of each of the cookies. In some embodiments, the mitigating of the website privacy issues may include blocking one or more of the cookies, disabling one or more of the cookies, preventing creation of one or more cookies that are similar to one or more of the cookies, alerting an administrator regarding one or more of the cookies, or some combination thereof. In some embodiments, the method may further include displaying, on a computing device display, the creator, sender, and receiver of each of the cookies. For example, the security app 114 may mitigate website privacy issues for the website 120 (e.g., the website W) based on the creator, sender, and receiver of each of the cookies 202-216 in the cookie tree 200, and may display the creator, sender, and receiver of each of the cookies 202-216, such as in the web browser 112.

Although the actions of the method 300 are illustrated in FIG. 3 as discrete actions, various actions may be divided into additional actions, combined into fewer actions, reordered, expanded, or eliminated, depending on the desired implementation. For example, in some embodiments, action 306 may be eliminated. In another example, action 306 may be performed by a user or system administrator or other person or entity different from the entity performing the other actions of the method 300.

The method 300 may thus be employed, in some embodiments, to better identify all actors involved in a cookie ecosystem that create privacy risks that result from uninformed cookie creation and sharing events. In particular, the method 300 may be employed to precisely identify each of the actors that are involved both in the generation and the sharing of the cookies 202-216. Further, the method may identify a complete list of third-parties, with assigned roles, thus allowing the user to choose what cookies to block and what cookies to allow. These roles may constitute different privacy risks to the user depending on the website. The method 300 may then employ this precise identification of actors in order to make the website 120 compliant with specific privacy laws and regulations, such as the GDPR in the EU, and/or in order to protect users from being tracked without users' knowledge or permission.

The method 300 may provide a plurality of benefits and technological improvements, and may result in the practical application of analyzing cookies, generating a cookie tree, and identifying actors involved in a cookie ecosystem, as opposed to simply using blacklists or heuristics. Furthermore, the method 300 described herein may provide the technological improvement of determining all parties involved in the creation of, sending of, and receiving of each cookie on a website and the techniques used to create and share each cookie. With this information, the cookies may be better controlled and any privacy issues caused by the cookies may be mitigated. Furthermore, controlling the cookies may result in the practical application of making websites compliant with laws and regulations, such as the GDPR in the EU, and/or result in protecting users from being tracked without users' knowledge or permission.

Also, the method 300 may improve the technological field of personal and business privacy and security by targeting a specific type of attack, and stopping the attack before the attack occurs or preventing the attack from causing further damage. A security action may be implemented automatically, without input from a human administrator, to mitigate, eliminate, or otherwise stop a malicious attack. For example, a security action may include quarantining a machine, software, or a process; blacklisting a file or a function; blocking network connectivity, etc. Privacy may be an important aspect for both individuals and institutions, and the method 300 may provide an advanced and reliable method for analyzing web privacy and aiding websites in becoming compliant with privacy laws and regulations.

FIG. 4 illustrates an example computer system 400 that may be employed in mitigating website privacy issues by automatically identifying cookie sharing risks in a cookie ecosystem. In some embodiments, the computer system 400 may be part of any of the systems or devices described in this disclosure. For example, the computer system 400 may be part of any of the user device 104, the web server 106, the security server 108, and/or the third-party web server 110 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the apps disclosed herein, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as the apps disclosed herein.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special-purpose or general-purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, is described with reference to specific embodiments; however, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed, and various embodiments with various modifications as may be suited to the particular use contemplated.

The invention claimed is:

1. A computer-implemented method for mitigating website privacy issues by automatically identifying cookie sharing risks in a cookie ecosystem, at least a portion of the method being performed by a computing device comprising one or more processors, the computer-implemented method comprising:
   generating, by the computing device, a cookie tree representing cookies created on a web browser while browsing a website, the cookie tree comprising nodes representing organizations and hierarchical edges between the nodes representing creation chains of the nodes;
   determining, by the computing device, a creator, a sender, and a receiver of each of the cookies, wherein the creator, the sender, and the receiver are organizations that are represented by nodes in the cookie tree and the receiver of each of the cookies is an organization other than the website; and
   mitigating, by the computing device, website privacy issues based on the creator, sender, and receiver of each of the cookies.

2. The computer-implemented method of claim 1, wherein the mitigating of the website privacy issues comprises:
   blocking one or more of the cookies;
   disabling one or more of the cookies;
   preventing creation of one or more cookies that are similar to one or more of the cookies;
   alerting an administrator regarding one or more of the cookies; or
   some combination thereof.

3. The computer-implemented method of claim 1, wherein the determining of the creator of each of the cookies comprises determining that the creator is:
   a first party creator in which the website sets the cookie for the website;
   a third party creator in which a third-party resource that is loaded externally from the website sets the cookie for a third party; or
   a ghostwriter creator in which a third-party resource that is loaded externally from the website sets the cookie for the website.

4. The computer-implemented method of claim 3, wherein the determining of the sender of each of the cookies comprises determining that the sender is:
   an own sender in which the cookie is sent by a node that created the cookie;
   an in-chain sender in which the cookie is sent by a node that is in a creation chain of the node that created the cookie; or
   an off-chain sender in which the cookie is sent by a node that is not in a creation chain of the node that created the cookie.

5. The computer-implemented method of claim 4, wherein the determining of the receiver of each of the cookies comprises determining that the receiver is:
   an own receiver in which the cookie is received by a node that created the cookie;
   an in-chain receiver in which the cookie is received by a node that is in a creation chain of the node that created the cookie; or
   an off-chain receiver in which the cookie is received by a node that is not in a creation chain of the node that created the cookie.

6. The computer-implemented method of claim 1, further comprising displaying, on a computing device display, the creator, the sender, and the receiver of each of the cookies.

7. The computer-implemented method of claim 1, wherein the generating of the cookie tree further comprises mapping multiple domains to a single organization.

8. One or more non-transitory computer-readable media comprising one or more computer readable instructions that, when executed by one or more processors of a computing device, cause the computing device to perform a method for mitigating website privacy issues by automatically identifying cookie sharing risks in a cookie ecosystem, the method comprising:
   generating, by the computing device, a cookie tree representing cookies created on a web browser while browsing a website, the cookie tree comprising nodes representing organizations and hierarchical edges between the nodes representing creation chains of the nodes;
   determining, by the computing device, a creator, a sender, and a receiver of each of the cookies, wherein the creator, the sender, and the receiver are organizations that are represented by nodes in the cookie tree and the receiver of each of the cookies is an organization other than the website; and
   mitigating, by the computing device, website privacy issues based on the creator, sender, and receiver of each of the cookies.

9. The one or more non-transitory computer-readable media of claim 8, wherein the mitigating of the website privacy issues comprises:
   blocking one or more of the cookies;
   disabling one or more of the cookies;
   preventing creation of one or more cookies that are similar to one or more of the cookies;
   alerting an administrator regarding one or more of the cookies; or
   some combination thereof.

10. The one or more non-transitory computer-readable media of claim 8, wherein the determining of the creator of each of the cookies comprises determining that the creator is:

a first party creator in which the website sets the cookie for the website;

a third party creator in which a third-party resource that is loaded externally from the website sets the cookie for a third party; or a ghostwriter creator in which a third-party resource that is loaded externally from the website sets the cookie for the website.

11. The one or more non-transitory computer-readable media of claim 10, wherein the determining of the sender of each of the cookies comprises determining that the sender is:

an own sender in which the cookie is sent by a node that created the cookie;

an in-chain sender in which the cookie is sent by a node that is in a creation chain of the node that created the cookie; or an off-chain sender in which the cookie is sent by a node that is not in a creation chain of the node that created the cookie.

12. The one or more non-transitory computer-readable media of claim 11, wherein the determining of the receiver of each of the cookies comprises determining that the receiver is:

an own receiver in which the cookie is received by a node that created the cookie;

an in-chain receiver in which the cookie is received by a node that is in a creation chain of the node that created the cookie; or an off-chain receiver in which the cookie is received by a node that is not in a creation chain of the node that created the cookie.

13. The one or more non-transitory computer-readable media of claim 8, further comprising displaying, on a computing device display, the creator, the sender, and the receiver of each of the cookies.

14. The one or more non-transitory computer-readable media of claim 8, wherein the generating of the cookie tree further comprises mapping multiple domains to a single organization.

15. A computing device comprising:

one or more processors; and one or more non-transitory computer-readable media comprising one or more computer-readable instructions that, when executed by the one or more processors, cause the computing device to perform a method for mitigating website privacy issues by automatically identifying cookie sharing risks in a cookie ecosystem, the method comprising:

generating a cookie tree representing cookies created on a web browser while browsing a website, the cookie tree comprising nodes representing organizations and hierarchical edges between the nodes representing creation chains of the nodes;

determining a creator, a sender, and a receiver of each of the cookies, wherein the creator, the sender, and the receiver are organizations that are represented by nodes in the cookie tree and the receiver of each of the cookies is an organization other than the website; and mitigating website privacy issues based on the creator, sender, and receiver of each of the cookies.

16. The computing device of claim 15, wherein the mitigating of the website privacy issues comprises:

blocking one or more of the cookies;

disabling one or more of the cookies;

preventing creation of one or more cookies that are similar to one or more of the cookies;

alerting an administrator regarding one or more of the cookies; or some combination thereof.

17. The computing device of claim 15, wherein the determining of the creator of each of the cookies comprises determining that the creator is:

a first party creator in which the website sets the cookie for the website;

a third party creator in which a third-party resource that is loaded externally from the website sets the cookie for a third party; or a ghostwriter creator in which a third-party resource that is loaded externally from the website sets the cookie for the website.

18. The computing device of claim 17, wherein the determining of the sender of each of the cookies comprises determining that the sender is:

an own sender in which the cookie is sent by a node that created the cookie;

an in-chain sender in which the cookie is sent by a node that is in a creation chain of the node that created the cookie; or an off-chain sender in which the cookie is sent by a node that is not in a creation chain of the node that created the cookie.

19. The computing device of claim 18, wherein the determining of the receiver of each of the cookies comprises determining that the receiver is:

an own receiver in which the cookie is received by a node that created the cookie;

an in-chain receiver in which the cookie is received by a node that is in a creation chain of the node that created the cookie; or an off-chain receiver in which the cookie is received by a node that is not in a creation chain of the node that created the cookie.

20. The computing device of claim 15, further comprising displaying, on a computing device display, the creator, the sender, and the receiver of each of the cookies.

* * * * *